(12) United States Patent
Bain et al.

(10) Patent No.: US 7,599,293 B1
(45) Date of Patent: Oct. 6, 2009

(54) SYSTEM AND METHOD FOR NETWORK TRAFFIC AND I/O TRANSACTION MONITORING OF A HIGH SPEED COMMUNICATIONS NETWORK

(76) Inventors: Lawrence Michael Bain, 1164 Phyllis Ct., Mountain View, CA (US) 94040; Craig Everett Foster, 49 Shower Dr., Unit S414, Mountain View, CA (US) 94040; Adam Hugh Schondelmayer, 10203 Miller Ave., Cupertino, CA (US) 95041

( * ) Notice: Subject to any disclaimer, the term of this patent is extended or adjusted under 35 U.S.C. 154(b) by 944 days.

(21) Appl. No.: 10/307,272

(22) Filed: Nov. 27, 2002

Related U.S. Application Data

(60) Provisional application No. 60/375,511, filed on Apr. 25, 2002.

(51) Int. Cl.
G01R 31/08 (2006.01)
(52) U.S. Cl. .................. 370/235; 370/389; 709/235
(58) Field of Classification Search .......... 370/229–239
See application file for complete search history.

(56) References Cited

U.S. PATENT DOCUMENTS

| | | | |
|---|---|---|---|
| 4,769,761 A * | 9/1988 | Downes et al. .............. 709/224 |
| 5,243,543 A | 9/1993 | Notess | |
| 5,600,632 A | 2/1997 | Schulman | |
| 5,689,688 A | 11/1997 | Strong et al. | |
| 5,694,615 A * | 12/1997 | Thapar et al. .................. 710/2 |
| 5,696,701 A | 12/1997 | Burgess et al. | |
| 5,761,424 A | 6/1998 | Adams et al. | |
| 5,812,529 A | 9/1998 | Czarnik et al. | |
| 5,886,643 A * | 3/1999 | Diebboll et al. ............. 709/224 |
| 5,905,868 A | 5/1999 | Baghai | |
| 5,958,009 A | 9/1999 | Friedrich | |
| 6,014,707 A | 1/2000 | Miller et al. | |
| 6,023,507 A | 2/2000 | Wookey | |
| 6,041,352 A | 3/2000 | Burdick | |
| 6,098,157 A | 8/2000 | Hsu et al. | |
| 6,157,955 A | 12/2000 | Narad et al. | |

(Continued)

FOREIGN PATENT DOCUMENTS

WO    WO 02/052400 A1    7/2002

OTHER PUBLICATIONS

Web page: Internetweek.com, Schultz, Keith, A Complete Solution, Enterasys Networks proves its mettle in enterprise-class switching, Jan. 22, 2001.

(Continued)

*Primary Examiner*—Robert W Wilson

(57) ABSTRACT

A network monitoring architecture and methodology enabling performance detection and diagnostics in storage area networks or other networks. The network monitoring is performed using a three-tiered distributed computing system architecture, including a data source tier, a portal tier and a client tier. The data source tier monitors the physical data on the network medium using multiple data collection sources, or data probes, connected to the network. The probes analyze network data and generate metrics that describe attributes of the network data. The metrics are used by the data portal tier, which is the second tier of the system. The portal tier encapsulates the metrics into data containers. The data containers may be requested by the client tier, which is the third tier in the network monitoring system. The client tier provides a user interface for displaying various types of network information derived from the contents of data containers.

5 Claims, 11 Drawing Sheets

U.S. PATENT DOCUMENTS

| | | | |
|---|---|---|---|
| 6,161,152 A * | 12/2000 | Garg et al. | 710/46 |
| 6,269,330 B1 | 7/2001 | Cidon | |
| 6,321,255 B1 | 11/2001 | May et al. | |
| 6,327,620 B1 * | 12/2001 | Tams et al. | 709/224 |
| 6,335,931 B1 | 1/2002 | Strong et al. | |
| 6,385,636 B1 | 5/2002 | Suzuki | |
| 6,421,723 B1 * | 7/2002 | Tawil | 709/224 |
| 6,446,111 B1 | 9/2002 | Lowery | |
| 6,456,594 B1 * | 9/2002 | Kaplan et al. | 370/238 |
| 6,459,682 B1 * | 10/2002 | Ellesson et al. | 370/235 |
| 6,519,568 B1 * | 2/2003 | Harvey et al. | 705/1 |
| 6,522,205 B2 | 2/2003 | Kallio et al. | |
| 6,522,268 B2 | 2/2003 | Belu | |
| 6,625,648 B1 * | 9/2003 | Schwaller et al. | 709/224 |
| 6,639,607 B1 * | 10/2003 | Ferguson et al. | 715/734 |
| 6,639,957 B2 | 10/2003 | Cahill-O'Brien et al. | |
| 6,651,099 B1 * | 11/2003 | Dietz et al. | 709/224 |
| 6,704,284 B1 | 3/2004 | Stevenson | |
| 6,708,292 B1 | 3/2004 | Mangasarian | |
| 6,785,237 B1 * | 8/2004 | Sufleta | 370/236 |
| 6,904,020 B1 * | 6/2005 | Love et al. | 370/252 |
| 6,925,052 B1 * | 8/2005 | Reynolds et al. | 370/217 |
| 6,975,592 B1 * | 12/2005 | Seddigh et al. | 370/230 |
| 6,976,062 B1 | 12/2005 | Denby et al. | |
| 7,124,180 B1 * | 10/2006 | Ranous | 709/224 |
| 7,151,966 B1 | 12/2006 | Baier | |
| 7,193,968 B1 * | 3/2007 | Kapoor et al. | 370/235 |
| 2001/0022823 A1 | 9/2001 | Renaud | |
| 2002/0026475 A1 | 2/2002 | Marmor | |
| 2002/0191649 A1 * | 12/2002 | Woodring | 370/906 |

OTHER PUBLICATIONS

Web page: Marvell Press Release, Galileo Announces New High-Performance 240-port Ethernet Switch Reference Design, Sep. 13, 1999.

U.S. Appl. No. 10/424,367, filed Apr. 25, 2003; System and Method for Providing Data From Multiple Heterogenous Network Monitoring Probes to a Distributed Network Monitoring System; Craig Everett Foster, et al.

U.S. Appl. No. 10/424,364, filed Apr. 25, 2003; Reprogrammable Network Link Monitoring Device; Lawrence M. Bain, et al.

U.S. Appl. No. 10/424,363, filed Apr. 25, 2003; System and Method for Network Traffic and I/O Transaction Monitoring of a High Speed Communications Network; Lawrence Michael Bain, et al.

U.S. Appl. No. 10/424,361, filed Apr. 25, 2003; Deferred Processing of Continuous Metrics; Craig Everett Foster, et al.

Office action mailed Nov. 21, 2007, U.S. Appl. No. 10/424,363.

Office action mailed Jun. 11, 2007, U.S. Appl. No. 10/424,367.

Office action mailed Jun. 5, 2007, U.S. Appl. No. 10/424,364.

Office action mailed May 11, 2007, U.S. Appl. No. 10/424,363.

Office action mailed May 11, 2007, U.S. Appl. No. 10/424,361.

Office Action mailed Jul. 22, 2008, U.S. Appl. No. 10/424,363.

Final Office Action mailed Feb. 28, 2008, U.S. Appl. No. 10/424,361.

Office Action mailed Jul. 25, 2008, U.S. Appl. No. 10/424,361.

Final Office Action mailed May 14, 2008, U.S. Appl. No. 10/424,364.

Final Office Action mailed Jan. 23, 2008, U.S. Appl. No. 10/424,367.

Office Action mailed Jul. 15, 2008, U.S. Appl. No. 10/424,367.

Final Office Action mailed Mar. 16, 2009, U.S. Appl. No. 10/424,363.

Final Office Action mailed Dec. 3, 2008, U.S. Appl. No. 10/424,367.

Final Office Action mailed Dec. 18, 2008, U.S. Appl. No. 10/424,361.

Office Action mailed Dec. 3, 2008, U.S. Appl. No. 10/424,364.

Web page: Outstanding PC, Webopedia, Routing in the Internet dated May 7, 1996 Pp. 1-81-3.

Web page: Internetweek.com, Schultz, Keith, A Complete Solution, Enterasys Networks proves its mettle in enterprise-class switching, Jan. 22, 2001 Pp. 1-3.

* cited by examiner

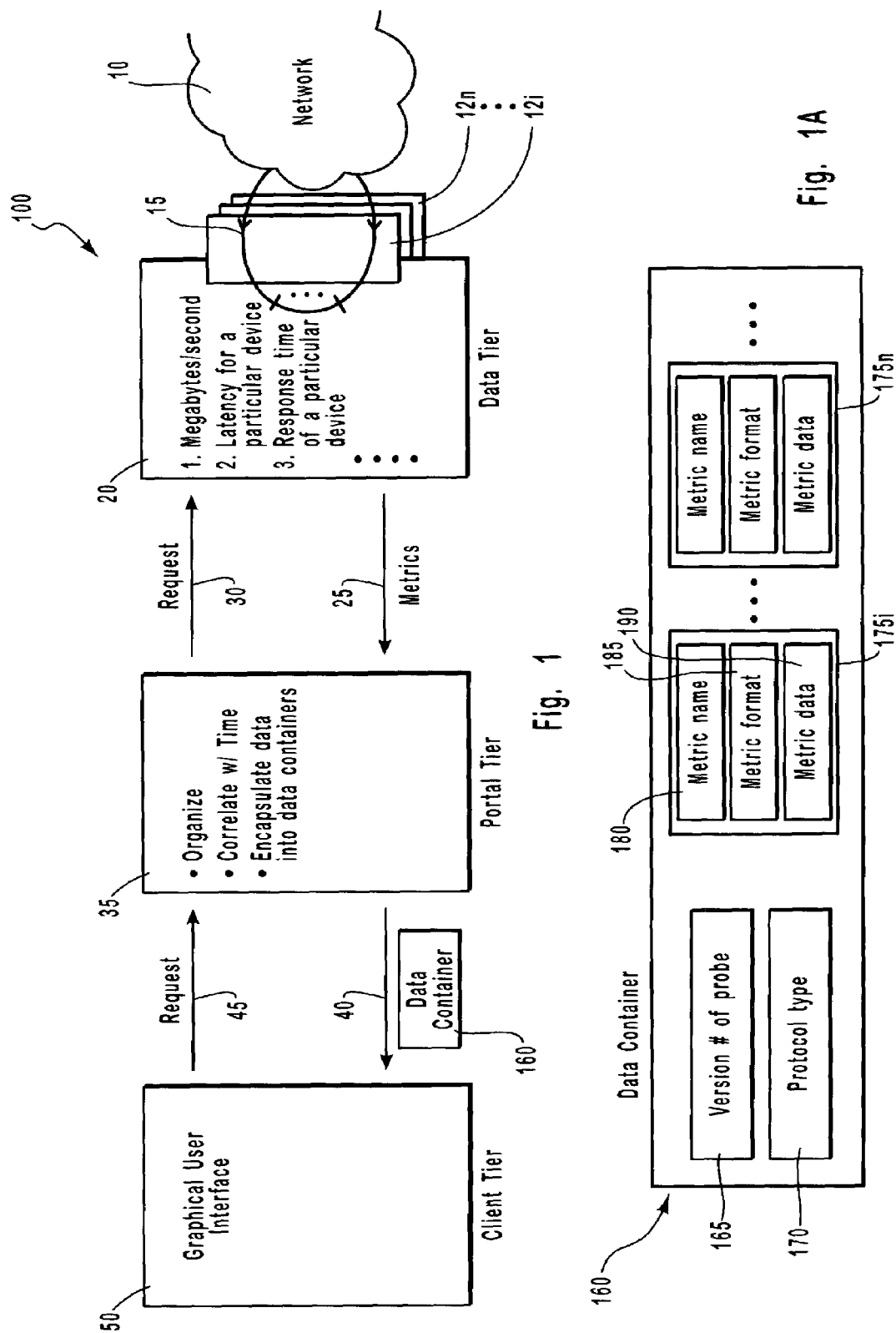

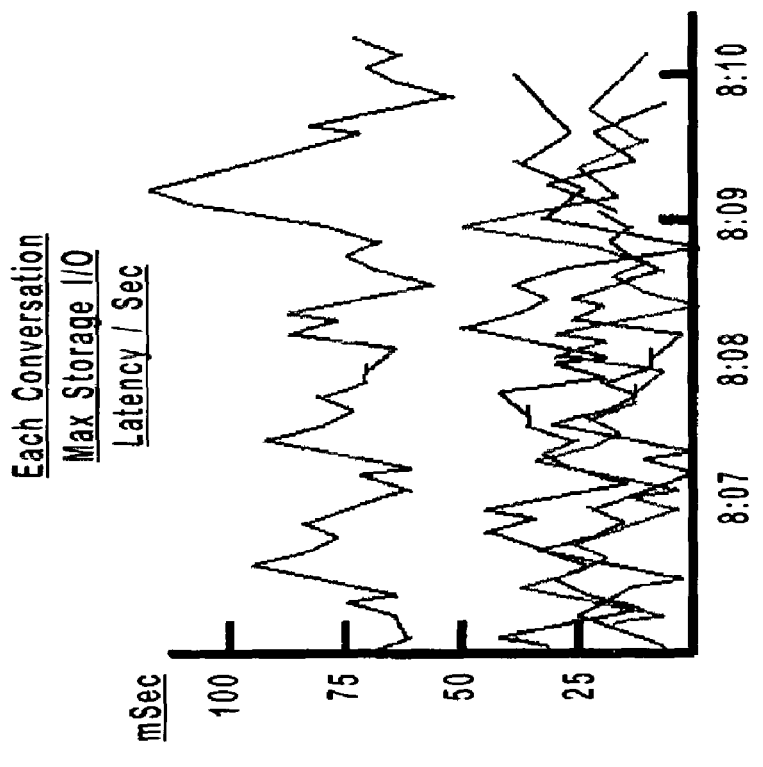
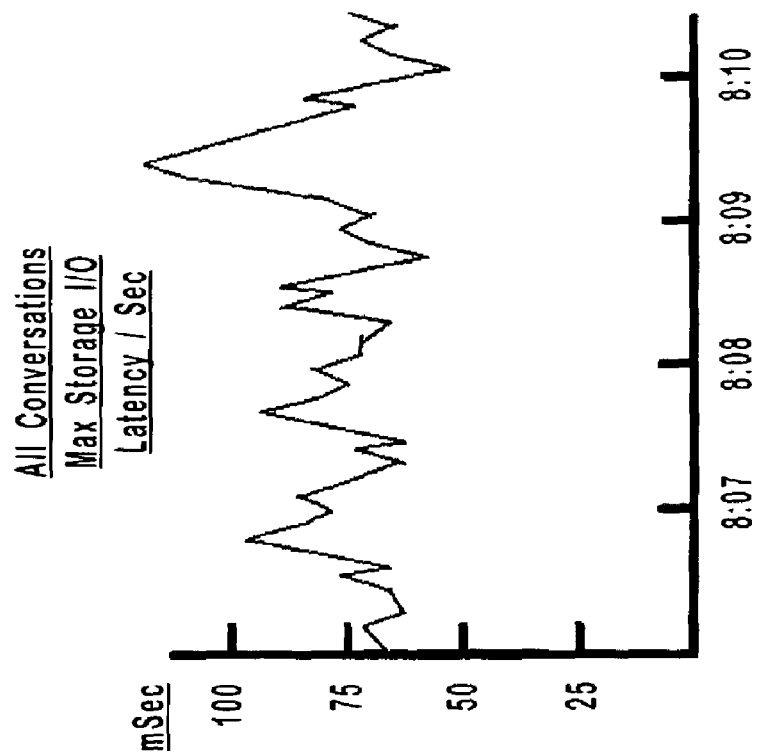
Fig. 3B
Fig. 3A

Scope
Fc/SCSI version 0.109 ▶

Default Views
Exchange Completion Times ▶

User/Views
▶

Aggregation
ITL | I | T | TL

| Initiator | Avg Read ECT | Min Read ECT | Max Read ECT | Avg Write ECT | Min Write ECT | Max Write ECT | Avg Other ECT | Min |
|---|---|---|---|---|---|---|---|---|
| 0x20f200 | 8.087 | 0.000 | 24.261 | 28.061 | 0.000 | 84.184 | 8.815 | |
| 0x2b0100 | 104.871 | 104.871 | 104.871 | 0.000 | 0.000 | 0.000 | 0.000 | |
| 0x201c00 | 24.400 | 0.000 | 87.110 | 10.863 | 0.000 | 43.453 | 13.620 | |
| 0x3e1d00 | 9.629 | 0.000 | 28.888 | 77.820 | 56.049 | 96.326 | 0.000 | |

Fig. 5

SYSTEM AND METHOD FOR NETWORK TRAFFIC AND I/O TRANSACTION MONITORING OF A HIGH SPEED COMMUNICATIONS NETWORK

RELATED APPLICATION INFORMATION

This application claims priority to and the benefit of U.S. Provisional Application Ser. No. 60/375,511, filed Apr. 25, 2002 and entitled "System and Method For Network Traffic and I/O Transaction Monitoring of a High Speed Communications Network." That application is incorporated herein by reference in its entirety.

BACKGROUND OF THE INVENTION

1. The Field of the Invention

This invention relates generally to the field of high speed communications systems and networks. More particularly, embodiments of the present invention relate to systems and methods for the analysis and processing of network traffic attributes, such as storage I/O transaction specific attributes in a Storage Area Network (SAN).

2. The Relevant Technology

Computer and data communications networks continue to proliferate due to declining costs, increasing performance of computer and networking equipment, and increasing demand for communication bandwidth. Communications networks—including wide area networks ("WANs") and local area networks ("LANs")—allow increased productivity and utilization of distributed computers or stations through the sharing of resources, the transfer of voice and data, and the processing of voice, data and related information at the most efficient locations. Moreover, as organizations have recognized the economic benefits of using communications networks, network applications such as electronic mail, remote host access, distributed databases and digital voice communications are increasingly used as a means to increase user productivity. This increased demand, together with the growing number of distributed computing resources, has resulted in a rapid expansion of the number of installed networks.

As the demand for networks has grown, network technology has grown to include many different communication protocols and physical configurations. Examples include Ethernet, Token Ring, Fiber Distributed Data Interface ("FDDI"), Fibre Channel, and InfiniBand networks. These and the many other types of networks that have been developed typically utilize different cabling systems, different communication protocols, provide different bandwidths, and typically transmit data at different speeds.

The recent availability of low cost, high speed network technologies has also given rise to new uses of networks in specific application areas. One such example is referred to as a Storage Area Network (SAN). A SAN is a network whose primary purpose is the transfer of data between computer systems and data storage devices, and among data storage devices, based on protocols developed specifically for data storage operations. SANs have expanded from simple replacements for directly connected storage I/O buses that connect small numbers of storage devices across short distances to a single computer, to complex switched networks that connect hundreds or thousands of computing and data storage end-devices. Moreover, SANs are now being connected to even larger scale metropolitan area networks (MANs) and wide area networks (WANs) that extend the distances of SAN networks into thousands of miles.

High speed networks can be very efficient at utilizing the network bandwidth to transfer large amounts of data. However, as such networks grow in size, and become more complex and diverse, they become more difficult to manage, monitor and maintain at optimum operating levels. Therefore, as networks continue to grow in size and speed, it is becoming increasingly important to provide network administrators and integrators with improved monitoring and analysis capabilities. For example, the growing complexity and spanned distances of SAN networks can adversely impact the performance experienced by the individual storage I/O operations that transit the network. Consequently, there is an increased need to be able to monitor the communication performance of the specific storage I/O transactions between the various end-devices to ensure that adequate performance levels are maintained. Similarly, there is a need for the ability to monitor for device errors that may adversely impact overall network efficiency and forewarn of individual device failures.

Unfortunately, existing network monitoring methods and techniques, especially those for a SAN, have not been entirely satisfactory in providing a sufficient level of monitoring, analysis and troubleshooting capabilities. Consequently, network administrators and managers often do not have a sufficient level of information about the operating parameters of a network, and therefore are not able to fully monitor and optimize the network's operation.

For example, conventional methods typically only monitor network traffic at the aggregate flow level for a particular network link. In other words, only the communication throughput is measured at a particular location within the network. Throughput is a measurement of how much data is being sent between two adjacent nodes in the network. Unfortunately, the throughput parameter provides only limited information about the communication performance experienced by individual end-device transactions within the network. For example, in a SAN environment a high throughput does not necessarily mean that each storage I/O request is being transferred in the most expedient manner possible. In a SAN, storage I/O operations are composed of request/response/completion-status sequences of network traffic primitives to form an atomic "Storage I/O Transaction." Client application performance can be highly impacted by attributes of these individual storage I/O transactions. For example, attributes such as transaction latency and number of retries can be highly relevant in analyzing SAN performance. It has been shown that in a shared storage I/O channel or network environment, I/O transaction latency commonly deteriorates exponentially as aggregate throughput increases. Therefore, a very high traffic throughput is not necessarily an indicator of good network performance because this will often indicate that an undesirable amount of I/O transaction latency is occurring in the system. Since conventional networking monitoring systems do not monitor the individual attributes of storage I/O transactions, they do not provide the requisite level of information for understanding a given network's operational status.

Another drawback of existing methods for monitoring high speed networks—such as a SAN—is the inability to provide a global upgrade to all monitoring devices used by the monitoring system. Network monitoring systems typically use some form of monitoring device (sometimes referred to as a "probe") that is directly or indirectly inserted into one of the data channels located within the network. This monitor can then obtain information about the data that is being transferred at that particular network location, which is then provided to a single host device. To do so, each monitoring device must be specifically configured to operate in the environment of the network to which it is connected. Thus, when the communication protocol of the high speed network is upgraded, then all of the monitoring devices must also be replaced or the hardware must be upgraded in a like manner. Such a scenario is not uncommon. For example, many network storage devices in a SAN use the SCSI protocol to transfer data. In the future, updated versions of SCSI or even new transfer protocols likely will be adopted, which will require updates to any monitoring devices. The requirement for such a "global" upgrade is time consuming and expensive, and is difficult to provide with conventional monitoring systems.

Existing monitoring systems also suffer from another related problem. In particular, conventional monitoring systems do not support monitoring environments having multiple probes that are monitoring different network protocols. Instead, each of the probes must be configured for a single particular protocol type. This greatly reduces the ability to accurately monitor the operating conditions of a typical network implementation. For example, today's SANs are increasingly implemented as inter-connections of network segments that are using different protocols. As such, it is important to be able to compare traffic activity on a segment using one protocol, with traffic activity on another segment that is using a different protocol (e.g., Fibre Channel on one segment and Ethernet on another segment).

Conventional systems suffer from a closely related problem as well. In particular, conventional monitoring systems require that each monitoring device be configured in the same way as all other monitoring devices in the system so that the information being obtained is provided in a uniform and consistent manner to the monitoring system. Thus, when the software version of one device is upgraded, then all of the monitoring devices must also be upgraded in a like manner. For example, when a new network monitoring device is introduced that contains a different software version, the other monitoring devices must also be globally upgraded so as to insure proper operation. Again, such global upgrades of this sort are demanding of time and resources and are expensive.

The use of network monitoring devices gives rise to other problems as well. For example, as networks—such as SANs—increase in size, it is becoming more important to record network information at multiple locations within the network to accurately monitor the network operating status. To do so, multiple monitoring devices must be connected throughout the network at various locations. To fully utilize this multiple probe system, the data provided by each probe should be comparable to the data provided from the other probes. This introduces a new obstacle of synchronizing the multiple data sources in order to accurately compare and contrast the efficiency of different parts of the network at a given point in time. Many new networks, such as optical networks, operate at a very high rates of speed. Thus, a network monitoring synchronization scheme must have the capacity to keep up with each network monitor to prevent individual monitors from drifting further and further out of synchronization from the others. In addition, the network monitoring synchronization scheme must continuously ensure that all of the network monitoring data from one monitoring device is properly synchronized with the network monitoring data from the other monitoring devices.

High network speeds create other problems as well. In particular, as networking speeds continue to advance, it becomes more and more difficult for networking monitoring devices to obtain relevant network information in "real time." In particular, existing monitoring devices are not able to monitor Gigabit-rate network traffic at full line rate speeds. Consequently, network "conditions" can often be missed, and such systems are thus unable to monitor all network characteristics accurately.

Therefore, there is a need for an improved network monitoring system. Preferably, the monitoring system should be capable of obtaining the attributes of individual network transactions occurring within the network, such as attributes of I/O transactions occurring within a SAN continuously and in real time at full line rate speeds. In this way, the system would be able to monitor network operating parameters other than just raw throughput, and instead could identify and monitor the individual device transactions within the data communications network so that errors and latencies can be accurately monitored and attributed to the individual devices involved. In addition, an improved monitoring system should be capable of monitoring transaction level communications from multiple locations within the network, and in a manner so that the data obtained from the multiple locations is synchronized in time. Further, it would be an advancement in the art to provide a network monitoring system that is capable of receiving and processing data received from multiple heterogeneous monitoring devices—e.g., different types of monitoring devices, that are monitoring different protocols or running different software versions, etc. The system should optimize the amount of computational resources used to obtain attributes of network transactions, and in a manner that does not sacrifice the available number of network characteristics that can be viewed by a user, such as a network manager. Further, it would be an improvement if the network monitoring system could operate in the context of very high speed networks—including gigabit operating speeds.

SUMMARY OF EMBODIMENTS OF THE INVENTION

These and other problems in the prior art are addressed by embodiments of the present invention, which generally relates to systems and methods for implementing a network monitoring system that provides a number of features and advantages not currently available in conventional network monitoring solutions. In particular, the present invention provides a network monitoring architecture and methodology that enables network performance tuning, early detection of network problems, and diagnostic assistance for problems in the network, among other capabilities. While the teachings of the present invention will find applicability in a wide variety of network environments, protocols and applications, embodiments of the invention are especially well suited for specialized, high speed networking environments—including those operating at transmission speeds in excess of one Gigabit per second. For example, embodiments of the present invention provide an ideal monitoring environment for accurately monitoring the actual behavior of computer secondary storage I/O traffic over complex serial storage networks, otherwise known as Storage Area Networks (SANs). In addition, the architecture used by embodiments of the present monitoring system provides the capability to correlate measurements from multiple points taken simultaneously within a large distributed network environment.

By way of summary, preferred embodiments of network monitoring system are premised on a three-tiered distributed computing system architecture. The three distinct tiers of the network monitoring system are referred to as a data source tier, a portal tier and a client tier.

The data source tier is the functional component that is responsible for actually monitoring the physical data present on the network medium. Preferably, the data source tier is comprised of a plurality of data collection sources, otherwise referred to as "data probes," which are connected (either directly or indirectly) to the network. Each of these data probes monitor the physical data present on the network medium and, in a preferred embodiment, generate discrete intervals of data. The probes then analyze these data intervals, and identify specific "attributes" of the network data. These attributes can be certain characteristic or statistic information that relates to the monitored network data. These attributes are generated in the form of "metrics," which are discrete data units. For example, in a SAN environment, each metric is "storage I/O" centric, and contain attributes of multi-interval storage I/O transactions between devices on the network. In addition, they may contain attributes of instantaneous events that may occur on the network. In preferred embodiments, metrics are generated at the data probes in substantially real time; that is, the probes are able to continuously generate metric information about the network traffic as fast as the traffic occurs within the network. In a SAN environment, this can exceed Gigabit per second traffic rates.

Once metrics are generated at individual data collection probes, they are forwarded to the next tier in the network system—the data portal tier. The portal tier is preferably implemented in software on a host computing device, and generally provides the function of collection, management and reformatting of the metric data collected from each of the data probes, which are each connected to the portal. In preferred embodiments, the portal tier manages the metric data by encapsulating metric data received from a probe into a data structure referred to as a "data container." This data container has a predefined format, and organizes the metric data in accordance with the type of attributes contained in the metrics.

Once generated at the portal tier, data containers may be requested by the third tier in the network monitoring system—the client tier. The client tier, which is also preferably implemented in software on a host computing device, provides a user interface that can be used by a user to selectively display various types of network information that is derived from the contents of data containers that are received from the portal tier. Preferably, the interface is a graphics-based interface, which allows a variety of graphical views of different network operating characteristics.

The presently disclosed network monitoring system and method provides a number of advantages over existing systems. In particular, the architecture and methodology provides the ability to obtain relevant network data in substantially real time. Moreover, the architecture allows for the collection of network data from various locations throughout the network, and yet does so in a way that the data can be easily viewed and compared by a user. This allows network administrators and integrators to resolve network problems and bottlenecks so that the full performance benefits of the network can be realized. Moreover, the approach is especially well suited for a transaction-based network, such as a SAN.

These and other features of the present invention will become more fully apparent from the following description and appended claims, or may be learned by the practice of the invention as set forth hereinafter.

BRIEF DESCRIPTION OF THE DRAWINGS

A more particular description of the current invention will be made by making reference to specific embodiments of the invention, which are illustrated in the appended drawings. These drawings depict only example embodiments of the invention and are not to be considered limiting of its scope.

The invention will be described and explained with additional specificity and detail through the use of the accompanying drawings, in which:

FIG. 1 illustrates a functional block diagram showing one presently preferred system and method for transaction level monitoring of a high speed communications network, such as a storage area network (SAN);

FIG. 1A illustrates a diagram of one presently preferred data container structure for use with the method of transaction monitoring illustrated in FIG. 1;

FIGS. 3A and 3B show two charts illustrating the value of monitoring storage I/O attributes by individual end-devices when the behavior of one device is significantly worse then all other devices;

FIGS. 5-9 illustrate additional various examples of presently preferred embodiments of user interfaces provided at a client tier of a exemplary monitoring system.

DESCRIPTION OF THE PREFERRED EMBODIMENTS

Figure 1B:
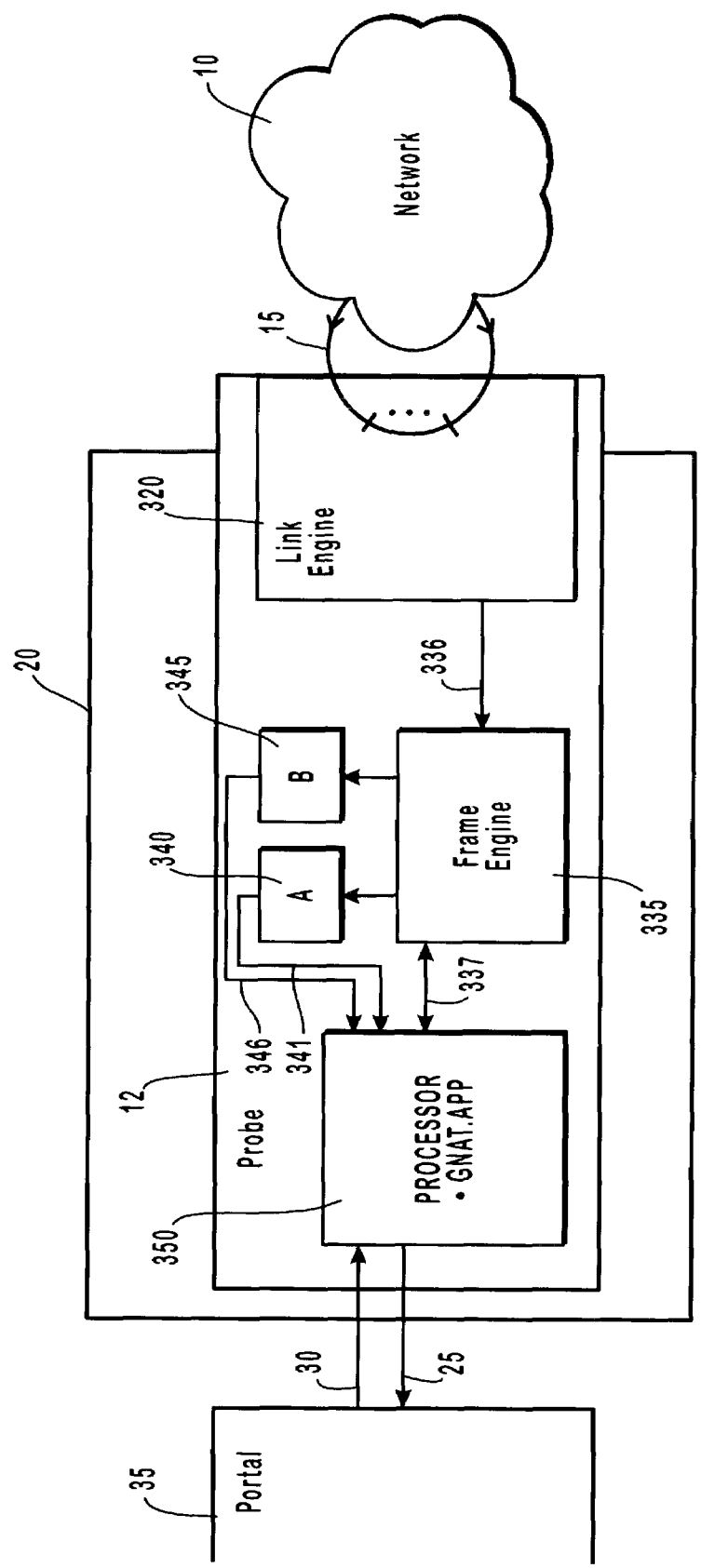
FIG. 1B illustrates a block diagram of a network monitoring device, or "probe," that can be used in conjunction with the method of transaction monitoring of FIG. 1.

Reference will now be made to the drawings, which illustrate presently preferred embodiments of the invention. The drawings are diagrammatic and schematic representations of the presently preferred embodiments, and are not limiting of the present invention, nor are they necessarily drawn to scale.

The present invention provides systems and methods for implementing a network monitoring system that provides a number of features and advantages not currently available in conventional network monitoring solutions. For example, the present invention provides a network monitoring environment that enables network performance tuning, early detection of network problems, and diagnostic assistance for problems in the network, among other capabilities. Moreover, embodiments of the invention are especially suited for specialized, high speed networking environments—including those in excess of one Gigabit per second. In particular, embodiments of the present invention provide a monitoring environment that addresses the need to monitor with accuracy the actual behavior of computer secondary storage I/O traffic over complex serial storage networks, otherwise known as Storage Area Networks (SANs). Further, the disclosed monitoring systems provide the capability to correlate measurements from multiple points taken simultaneously within a large distributed network environment. Finally, preferred embodiments of the invention provide such levels of functionality in a manner that minimizes disruption on a deployed monitoring environment.

For purposes of illustration, embodiments of the present invention are described in the context of a particular networking environment—a storage area network (SAN). However, it will be appreciated that the teachings of the present invention are applicable to other applications and networking environments as well. Similarly, the invention is not limited to any particular network or physical protocol; indeed, SAN network protocol technology itself is undergoing constant evolution, including Fibre Channel, iSCSI over Ethernet, FCIP over Ethernet, Infiniband, etc. Moreover, while illustrated embodiments may be described or implied as being implemented in the context of an optical-based network, it will be appreciated that the present invention is equally applicable to non-optics based networks, such as shielded electrical cables, etc.

In addition, as will become apparent from the following description, it will be appreciated that certain aspects of presently preferred embodiments may be implemented within a suitable computing environment. Thus, although not required, embodiments of the invention may be described in the general context of computer-executable instructions, such as program modules, being executed by computers operating within network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps. As is well know in the art, such computer-executable instructions can be embodied on any suitable computer-readable medium, including, without limitation, magnetic disk media, optical media, magnetic cassettes, flash memory devices, digital versatile disks, Bernoulli cartridges, RAMs, ROMs, and the like.

Similarly, those skilled in the art will appreciate that embodiments of the invention may be practiced in network computing environments with many types of computer system configurations, including personal computers, scientific workstations, hand-held and related portable devices, multi-processor systems, network PCs, minicomputers, mainframe computers, and the like. The invention may also be practiced in distributed computing environments where local and remote processing devices are linked (either by hardwired links, wireless links, or by a combination of hardwired or wireless links) through a communications network and both the local and remote processing devices perform tasks.

The Overall Network Monitoring System Architecture

In general, a preferred embodiment of the overall network monitoring system is implemented with three distinct tiers of functional components within a distributed computing and networking system. These three tiers of the network monitoring system, which is designated generally at 100 in FIG. 1, are referred to herein as a data source tier 20, a portal tier 35 and a client tier 50. The data source tier 20 is preferably comprised of multiple "data collection" sources capable of measuring network traffic at various points within the network, which is represented at 10 in FIG. 1. The portal tier 35 is a middle tier within the hierarchy. The portal tier 35 provides the function of collection, management and reformatting of the measurement data collected at the data source tier 20. It also provides management of the individual data collection entities that perform the role of network traffic measurement at the data source tier. Finally, the top level tier—referred to as the client tier 50—is preferably comprised of software implemented clients that provide visualizations of the network traffic that is being monitored at the data source tier 20. Optionally, the client tier 50 also provides additional ancillary processing of the monitored data.

Figure 2:
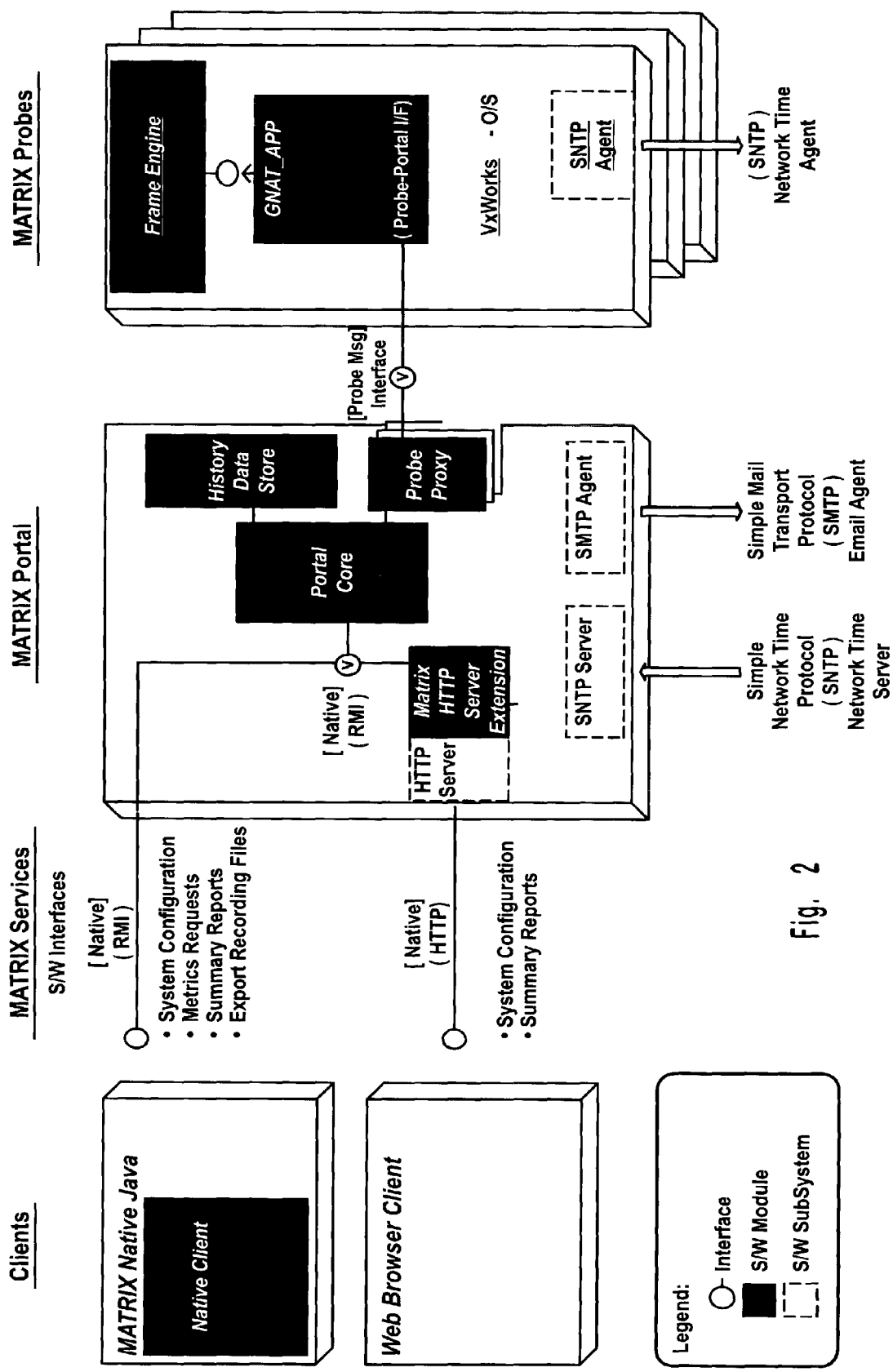
FIG. 2 illustrates a more detailed block diagram showing in further detail one presently preferred embodiment of a system for transaction level monitoring of a storage area network (SAN)

FIG. 2 illustrates a more detailed functional schematic of the data tier, portal tier and client tier and the functional interconnection of the three tiers. The various data communication interfaces between the tiers are illustrated to show one presently preferred embodiment of a system and method for transaction monitoring of a storage area network.

Following is a more detailed description of one presently preferred implementation of the three tiers used in the current monitoring system 100.

A. The Data Source Tier

The illustrated data source tier 20 is one example of a means for continuously monitoring network traffic that is traversing a network connection point that is being monitored, and for then producing a descriptive summary (referred to herein as a "metric") that is representative of at least one characteristic of the corresponding network traffic. In a preferred embodiment, the data source tier 20 is comprised of one or more data collection sources that are operatively connected to the network transmission medium at different points within the network 10. As is indicated at schematic line 25 in FIG. 1, each metric is then passed to the next tier in the overall system 100, the portal tier 35, which will be described in further detail below.

While a generated metric can be comprised of any suitable descriptor of corresponding network behavior, in the example embodiment (i.e., a SAN environment) these descriptive metrics are "storage I/O" centric; that is, they contain attributes of multi-interval storage I/O transactions between devices, as well as attributes of instantaneous events. Storage I/O transaction metrics can include, for example, attributes such as latency for transactions directed to a particular storage device; response times for a particular device; block transfer sizes; completion status of a transfer; and others. Instantaneous event attributes can include, for example, certain types of errors and non-transaction related information such as aggregate throughput (e.g., megabytes/second).

In a presently preferred embodiment, the multiple data collection sources used to measure network traffic are referred to herein as "probes," and are designated at 12 in FIG. 1. As noted, in a typical application a number of these probes would be inserted into the network 10 at different locations to produce specific information about the particular data flow, one example of which is schematically denoted at 15, that is occurring at the corresponding given network connection point. Again, attributes of the monitored data are identified and placed in the form of a metric by the probe. Thus, each probe is implemented to generate metrics that characterize and/or represent the instantaneous events and storage I/O transactions that are occurring at the corresponding network connection point. Often, and depending on the type of attribute involved, multiple storage I/O transactions must be observed and analyzed before a particular metric can be constructed. Moreover, the use of multiple probes throughout the network result in the generation of metric information that can be used to provide a comprehensive view of the network's operating status.

The probes 12 are preferably implemented so as to be capable of monitoring the network data flow 15 and generating the corresponding metric(s) in substantially "real time." Said differently, the probes are able to continuously generate metrics about the traffic as fast as the traffic occurs within the network 10, even at the Gigabit traffic rates and greater that are encountered in high speed SANs. This ability to collect and generate metrics at full wire-speeds insures that network operating conditions can be accurately monitored.

As noted, in one embodiment the probes are connected directly to the network medium. In an alternative embodiment, a passive optical tap can be disposed between the network medium and the probe device. The passive tap is then used to feed a copy of the data flow 15 directly into the probe. One advantage of incorporating a passive optical tap is that if the probe malfunctions for any reason, the data flow 15 within the network 10 is not affected. In contrast, if a probe is used directly "in-line," there is a potential for data interruption if the probe malfunctions.

Regardless of how a probe is connected to the network—directly or via a passive tap—it does not become an identified network device within the network 10. Instead, a probe transparently calculates and measures metrics about the data flow 15 wherever it is connected within the network.

It will be appreciated that a number of probe implementations could be used. However, in general, the probe preferably provides several general functions. First, each probe includes a means for optically (if applicable), electrically and physically interfacing with the corresponding network medium, so as to be capable of receiving a corresponding data flow. In addition, each probe 12 includes means for receiving a data flow 15 from the network and then processing the data flow 15 so as to generate a corresponding metric or metrics. The receiving means can be implemented as a high speed network processing circuit that is able to provide such functionality in substantially real time with the corresponding network speed. The probe may further include means for providing a functional interface between the high speed processing circuit and the portal tier 35. In preferred embodiments the interface means is implemented via a programmable device that would, for example, handle the forwarding of the metric(s) at the request of the portal tier. It may also format the metrics in a predefined manner, and include additional information regarding the probe for further processing by the portal tier, as will be described in further detail below. It will be appreciated that the above functionality of the high speed processing circuit and the separate programmable device could also be provided by a single programmable device, provided that the device can provide the functionality at the speeds required.

By way of example and not limitation, one presently preferred probe implementation is shown in FIG. 1B, to which reference is now made. In this embodiment, the probe 12 includes a link engine circuit, designated at 320, that is interconnected with a high speed, network traffic processor circuit, or "frame engine" 335. In general, the frame engine 335 is configured to be capable of monitoring intervals of data 15 on the network, and then processing and generating metric(s) containing attributes that are representative of characteristics of the monitored data. While other implementations could be used, in a presently preferred embodiment the frame engine 335 is implemented in accordance with the teachings disclosed in pending U.S. application (Ser. No. 09/976,756, filed Oct. 12, 2001), entitled "Synchronous Network Traffic Processor" and assigned to the same entity as the present application. That application is incorporated herein by reference in its entirety.

Also included in probe 12 is programmable processor, such as an embedded processor 350, which has a corresponding software storage area and related memory. The processor 350 may be comprised of a single board computer with an embedded operating system, as well as hardware embedded processing logic to provide various functions. Also, associated with processor 350 is appropriate interface circuitry and software for providing a control interface (at 337) and data interfaces (at 341 and 346) with the frame engine 335, as well as a data and control interface with the portal tier 35 (at 30 and 25). In a preferred embodiment, the processor 350 executes application software for providing, among other functions, the interface functionality with the frame engine 335, as well as with the portal tier 35. One presently preferred implementation of this embedded application software is referred to herein, and represented in FIG. 1B, as the "GNAT.APP."

In the illustrated embodiment, the link engine 320 portion of the probe 12 provides several functions. First, the link engine 320 includes a network interface portion that provides an interface with the corresponding network 10 so as to permit receipt of the interval data 15. Of course, the specific implementation will depend on the type of network to which the probe is connected. In addition, in a presently preferred embodiment the link engine 320 receives the data stream interval 15 and restructures the data into a format more easily read by the frame engine logic 335 portion of the probe 12. For example, the link engine 320 is implemented to drop redundant or useless network information that is present within the data interval and that is not needed by the frame engine to generate metrics. This insures maximum processing efficiency by the probe 12 circuitry and especially the frame engine circuit 335. In addition, the link engine can be configured to provide additional "physical layer"-type functions. For example, it can inform the frame engine when a "link-level" event has occurred. This would include, for example, an occurrence on the network that is not contained within actual network traffic. For example, if a laser fails and stops transmitting a light signal on the network, i.e., a "Loss of Signal" event, there is no network traffic, which could not be detected by the frame engine. However, the condition can be detected by the link engine, and communicated to the frame engine.

The data flow interval obtained by the link engine is then forwarded to the frame engine 335 in substantially real time as is schematically indicated at 336. The interval data is then further analyzed by the frame engine 335, which creates at least one metric. Alternatively, multiple data intervals may be used to generate a metric, depending on the particular attribute(s) involved.

As noted, one primary function of the probe is to monitor the interval data 15, and generate corresponding metric data in substantially real time, i.e., at substantially the same speed as the network data is occurring on the network 10. Thus, there may be additional functionality provided to increase the overall data throughput of the probe. For example, in the illustrated embodiment, there is associated with the frame engine logic 335 a first data storage bank A 340 and a second data storage bank B 345, which each provide high speed memory storage buffers. In general, the buffers are used as a means for storing, and then forwarding—at high speeds—metrics generated by the frame engine. For example, in operation the frame engine 335 receives the monitored intervals of network data from the Link Engine 320, and creates at least one metric that includes attribute characteristics of the intervals of data. However, instead of forwarding the created metric(s) directly to the portal tier 35, it is first buffered in one of the data banks A 340 or B 345. To increase the overall throughput, while one data bank outputs its metric contents to the processor 350 (e.g., via interface 341 or 346), the other data bank is being filled with a new set of metric data created by the frame engine 335. This process occurs in predetermined fixed time intervals; for example, in one preferred embodiment the interval is fixed at one second.

Figure 1C:
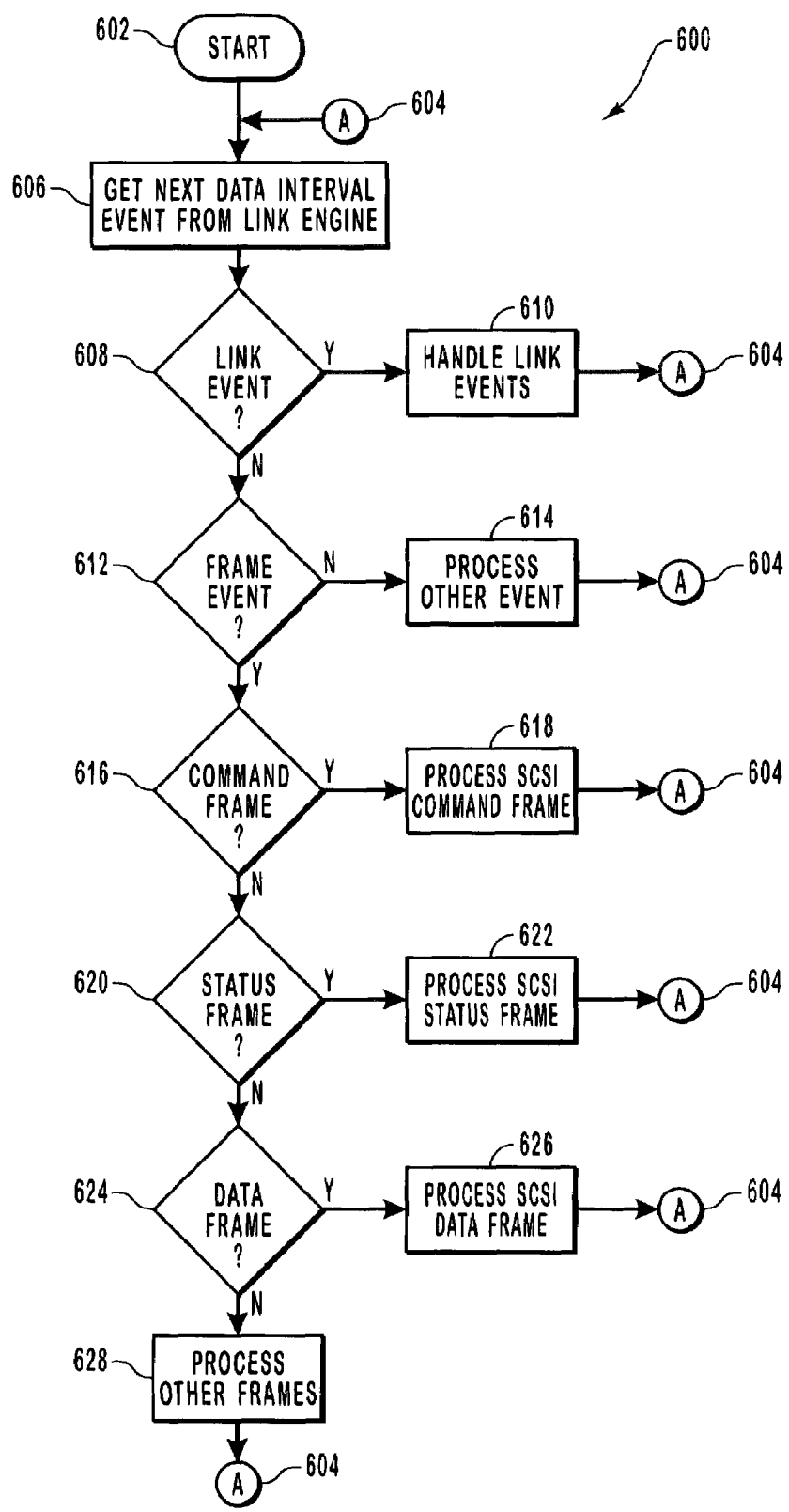
FIG. 1C is a flow chart illustrating one example of a series of computer executable steps that can be used to control the operation of a network monitoring device, such as the probe illustrated in FIG. 1B.

Reference is next made to FIG. 1C, which illustrates a flow chart denoting one example of a methodology, preferably implemented by way of computer executable instructions carried out by the probe's programmable devices, for monitoring network data and deriving metrics therefrom. This particular example is shown in the context of a Fibre Channel network running a SCSI upper level protocol. It will be appreciated however that the embodiment of FIG. 1C is offered by way of example and should not be viewed as limiting the present scope of the invention. Indeed, specific steps may depend on the needs of the particular implementation, the network monitoring requirements, particular protocols being monitored, etc.

Thus, beginning at step 602, a series of initialization steps occurs. For example, the overall probe system is initialized, various memory and registers are cleared or otherwise initialized. In a preferred embodiment, an "exchange table" memory area is cleared. The exchange table is an internal structure that refers to a series of exchange blocks that are used to keep track of, for example, a Fibre Channel exchange (a series of related events). In particular, ITL (Initiator/Target/Lun) exchange statistics (metrics) are generated using the data from this table. Data included within the exchange table may include, for example, target ID, initiator ID, LUN and other information to identify the exchange taking place. Additional data would be used to track, for example, payload bytes transmitted, the time of the command, the location where the data for the ITL is stored for subsequent transmission to the portal tier, and any other information relevant to a particular metric to be generated. Thus, in the present example, when a command is received, the table is created. The first data frame time is recorded, and the number of bytes are added whenever a frame is received. Finally, the status frame is the last event which completes the exchange and updates the table.

Once the requisite initialization has occurred, processing enters an overall loop, where data intervals on the network are monitored. Thus, beginning at program step 606, the next data interval "event" is obtained from the network via the link engine. Once obtained, processing will proceed depending on the type of event the data interval corresponds to.

If at step 608 it is determined that the data interval event corresponds to a "line event," then processing proceeds at step 610. For example, if the link engine detects a "Loss of Signal" event, or similar link level event, that condition is communicated to the frame engine because there is no network traffic present. Processing would then continue at 604 for retrieval of the next data interval event.

If at step 612 it is determined that the data interval event corresponds to an actual network "frame event," then processing proceeds with the series of steps beginning at 616 to first determine what type of frame event has occurred, and then to process the particular frame type accordingly. In the illustrated example, there are three general types of frame types: a command frame; a status frame; and a data frame. Each of these frames contain information that is relevant to the formulation of metric(s). For example, if it is determined that there is a command frame, then processing proceeds at 618, and the SCSI command frame is processed. At that step, various channel command statistics are updated, and data and statistics contained within the exchange table is updated. This information would then be used in the construction of the corresponding metric.

If however, the event corresponds to a status frame at step 620, then processing proceeds with a series of steps corresponding to the processing of a SCSI status frame at step 622. Again, corresponding values and statistics within the exchange table would be updated. Similarly, if the event corresponds to a SCSI data frame, processing proceeds at step 626, where a similar series of steps for updating the exchange table. Note that once a frame event has been identified and appropriately processed, processing returns to step 606 and the next data interval event is obtained.

Of course, implementations may also monitor other frame types. Thus, if the event obtained at step 606 is not a link event, and is not a SCSI frame event, then processing can proceed at step 628 with other frame event types. Processing will then return at step 606 until the monitoring session is complete.

It will be appreciated that FIG. 1C is meant to illustrate only one presently preferred operational mode for the probe, and is not meant to be limiting of the present invention. Other program implementations and operation sequences could also be implemented.

To summarize, the data tier 20 functions primarily as the data collection portion of the network monitoring system. Data collection is provided by way of a plurality of probes 12*i*-12*n*, that monitor discrete intervals of network traffic. Moreover, the probes generate metrics that contain data that are representative of the characteristics of the monitored data. For example, in a SAN environment, the probes monitor and generate metrics relating to "storage I/O centric" SCSI transactions at the individual Target/LUN level, enabling monitoring and analysis of end-device health and performance. To insure accurate and meaningful data, the probes provide full wire-speed monitoring performance.

B. The Portal Tier

The portal tier 35 illustrated in FIG. 1 is one presently preferred implementation of a means for gathering and aggregating the metrics generated at the data source tier 20 (received from the probes), and for managing and storing the metric data for later retrieval by the upper client tier 50. The portal tier 35 is preferably implemented in a software or firmware based module executing within a programmable device, such as a host computer. The host computer is then operatively connected to each of the probes distributed throughout the network. During operation, the portal tier 35 forwards a data request, as is indicated at 30 in FIG. 1, to a particular probe in data tier 20 via a predefined data interface. The data tier 20 (probe) responds by forwarding a metric (or metrics) to the portal tier 35, as is schematically indicated at 25.

Once the portal tier 35 has requested and received metrics from a corresponding data tier 20, the portal 35 then organizes the metrics in a predefined manner for either storage, reformatting, and/or immediate delivery to the client tier 50 as "secondary data." Note that the metrics can be stored or otherwise manipulated and formatted into secondary data at the portal tier 35 in any one of a number of ways, depending on the requirements of the particular network monitoring system. For example, if each of the data probes 12*i*-12*n* within a given monitoring system provide metrics that have an identical and consistent format, then the metrics could conceivably be passed as secondary data directly to the client tier 50 without any need for reformatting. However, in one presently preferred embodiment, the metric data received from data tier(s) is transformed into secondary data that is encapsulated into a predefined format before it is provided to the client tier 50. In this particular embodiment, the format of the data forwarded to the client tier 50 is in the form of a "data container," designated at 160 in FIGS. 1 and 1A.

While any one of a number of defined formats could be used, in one preferred embodiment a data container 160 contains fields for multiple metrics, as well as information about the format of the metrics that can be used by the client tier 50 (described below) to interpret the contents of the data container 160. For example, a single data container may contain an instantaneous event metric, such as megabytes per second, and a transaction I/O metric, such as a particular device's response time. FIG. 1A illustrates one presently preferred embodiment of the format of a data container 160. The illustrated data container 160 includes probe "version" information, such as probe version number field 165. This would indicate, for example, the exact type of probe that generated the metrics contained within the data container. In addition, the container 160 includes a protocol type field 160, which may indicate, for example, the particular protocol of the container—for example, Fibre Channel probe, or SCSI. Note that in some implementations, a probe may support multiple protocols, and thus provide multiple data container types (i.e., with different protocols). The data container may include yet additional descriptive information, depending on the particular requirements of the system. In a presently preferred embodiment, the container 160 further includes one or more metric information "fields," designated at 175*i*-175*n*. In general, examples of fields for SCSI metric type data may include 'frames/sec', 'number of check condition status frames', etc. The metric information fields 175 may further include a metric name field 180 (i.e., a specific identifier for the corresponding metric), a metric format field 185 (i.e., that indicates the specific format of the metric) and a metric data field 190 (i.e., the actual metric generated by the probe).

While a general format of a data container 160 has been provided, it will be appreciated that the concept can be extended to provide even further levels of functionality. For example, in addition to using the container to embed raw statistic metric type of data, the container can contain processor objects that provide the logic for supporting many different logical views of the metric data "on demand." Such functionality can be used to provide run-time "aggregation" and "derivation" of raw metric data into new fields. In a SCSI environment, aggregation capabilities may be used to generate such new fields as 'total counts by initiator independent of target/LUN', or other averages dependent on multiple other metrics. For example, in an exemplary embodiment, selected fields within a container are designated as "keys." Examples of key values for SCSI metrics would be 'initiator' (a device that initiates SCSI exchanges by sending SCSI commands to specific target/lun devices), 'target' (a device that responds to SCSI commands issued by an initiator), and 'lun' (the Logical Unit Number (LUN) associated with a SCSI target). Such keys can be used in conjunction with metric processor objects to aggregate the raw statistic metric data into logical views at the client. For example, a client may request that a data container holding SCSI Initiator/Target/Lun metric statistics provide a processor object to "aggregate" all of the fields by the Initiator key. The portal will create the processor object within the container and provide it to the client via the predefined interface. The Initiator "view" at the client can then provide aggregated statistics for each of the fields for each Initiator requested. Also, once a processor object has been created, it can operate on multiple instances of the same data container type. This would be useful, for example, to clients that need to monitor a continuous stream of metrics from a particular logical view.

It will be appreciated that providing this type of functionality via processor objects defers the actual processing to the client tier platform (via the data containers). Consequently, the overall running system can avoid the processing necessary to support the many permutations of such derived or aggregated statistics unless those specific logical views are actually requested at the client. This greatly reduces the minimum requirements for processing resources in the probes, as well as the network bandwidth requirements for moving metric data throughout the monitoring system.

Moreover, by using such a data container having a standardized and predefined format, this encapsulation of the metric data within the data container insulates the client tier 50, or applications executing within the client tier, from having to be aware of different types of probes used within the network monitoring system, or the format of data that they are forwarding. Instead, the client applications can be implemented in a manner such that they rely on the use of the information embedded within the data container to manipulate the metric data contained therein, rather than using apriori knowledge of the data itself. Because the data container utilizes a standard and predefined format, the client tier 50 can translate the metric data in accordance with the defined format. Therefore, in the event that a single probe is upgraded to a different software version, or a new type of probe is introduced within the system, or a new network protocol is utilized, there is no need for a software rewrite or upgrade of the client software.

In preferred embodiments, the network statistics provided by a portal tier by way of the data containers can be made available to the client tier 50 in different types of access modes. For example, a run time access mode can be provided which essentially provides the information with minimal time latency and minimal pre-processing between the time of the actual data collection at a probe and the data container's availability to a client tier 50. This type of mode could be used, for example, in a run time monitoring type of application. In addition, other access modes that provide network statistics on a historical basis can also be provided by the portal tier 35. For example, the portal tier can be implemented such that a recording of run time network statistics data can be made. This recording of network statistic data can then be stored at the portal. A playback mode can then be used to access the recorded data. In addition, multiple recordings can be made and stored at the portal tier 35. In preferred embodiments, the identity of individual recordings can be managed by assigning a name to each recording. The recordings can then be exported as files from a portal tier 35. Optionally, the recordings that are exported from one portal can be imported into another portal.

Depending on the particular application involved, multiple portal tiers may coexist within the context of a single monitored network, such as a SAN. However, in preferred implementations all probes are managed from a single portal which thereby allows for the correlation of data from all of the probes through a single viewpoint.

Depending on the needs of a particular application, the portal tier 35 can provide additional functions as well. For example, the portal tier 35 can be implemented so as to be capable of discovering the existence of all available probes on a network, and/or to check the operating status of particular probes. In addition, the portal may be implemented so as to be capable of changing the configuration of a connected probe.

To summarize, the portal tier 35 gathers, aggregates and stores metric (statistics) data from all available probes within a network, and then makes that data available to the client tier 50. Moreover, the data is encapsulated and provided to the client tier via a data structure a predefined and hardware independent format, referred to as a data container. This provides further flexibility and efficiency to the overall network monitoring system.

C. The Client Tier

In general, the client tier designated at 50 in FIG. 1, is one example of a means for receiving data containers from the portal tier and presenting the corresponding information to a user. Preferred embodiments of the client tier thus enable an end user to monitor and analyze multiple network links simultaneously. Thus, in a SAN environment, network information can be provided in a manner to allow the user to debug all levels of protocol traffic (link to device) of the SAN.

Preferably, the client tier 50 is comprised of software components executing on a host device that is operably connected to at least one portal tier 35. By way of this connection, the client tier 50 is able to initiate requests for the secondary data (e.g., data containers in the preferred embodiment) from the portal tier 35. Preferably, the client tier 50 requests information 45 from the portal tier 35 via a defined data communication interface, as is indicated schematically at 45 in FIG. 1. In response, the portal tier 35 provides the secondary data to the client tier 50, as is schematically indicated at 40, also via a defined interface.

Figure 4:
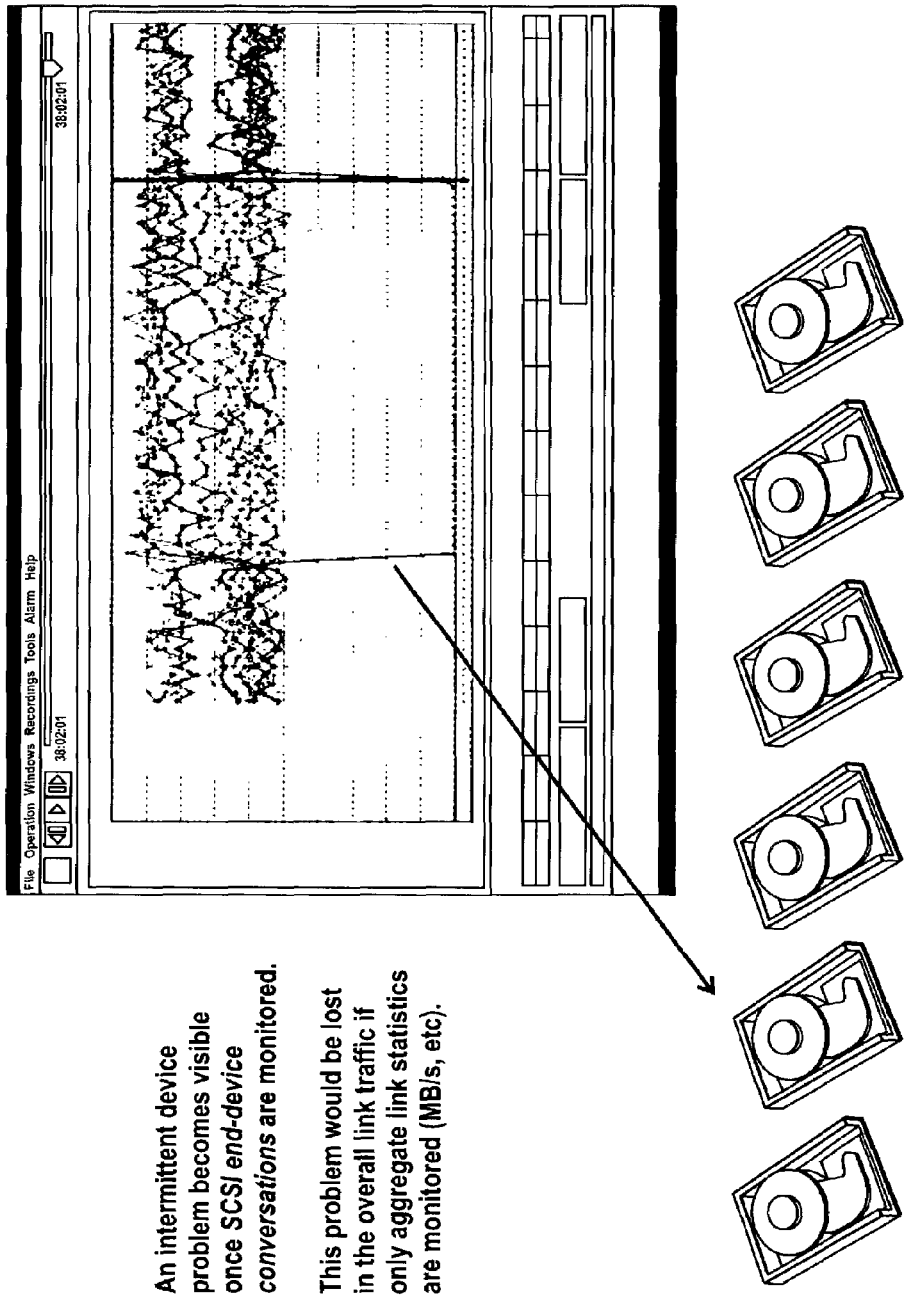
FIG. 4 is illustrates one example of a user interface provided at the client tier, showing statistics that demonstrates the importance of monitoring individual device transaction level attributes in a SAN environment so as to better identify network problems.
Figure 6:
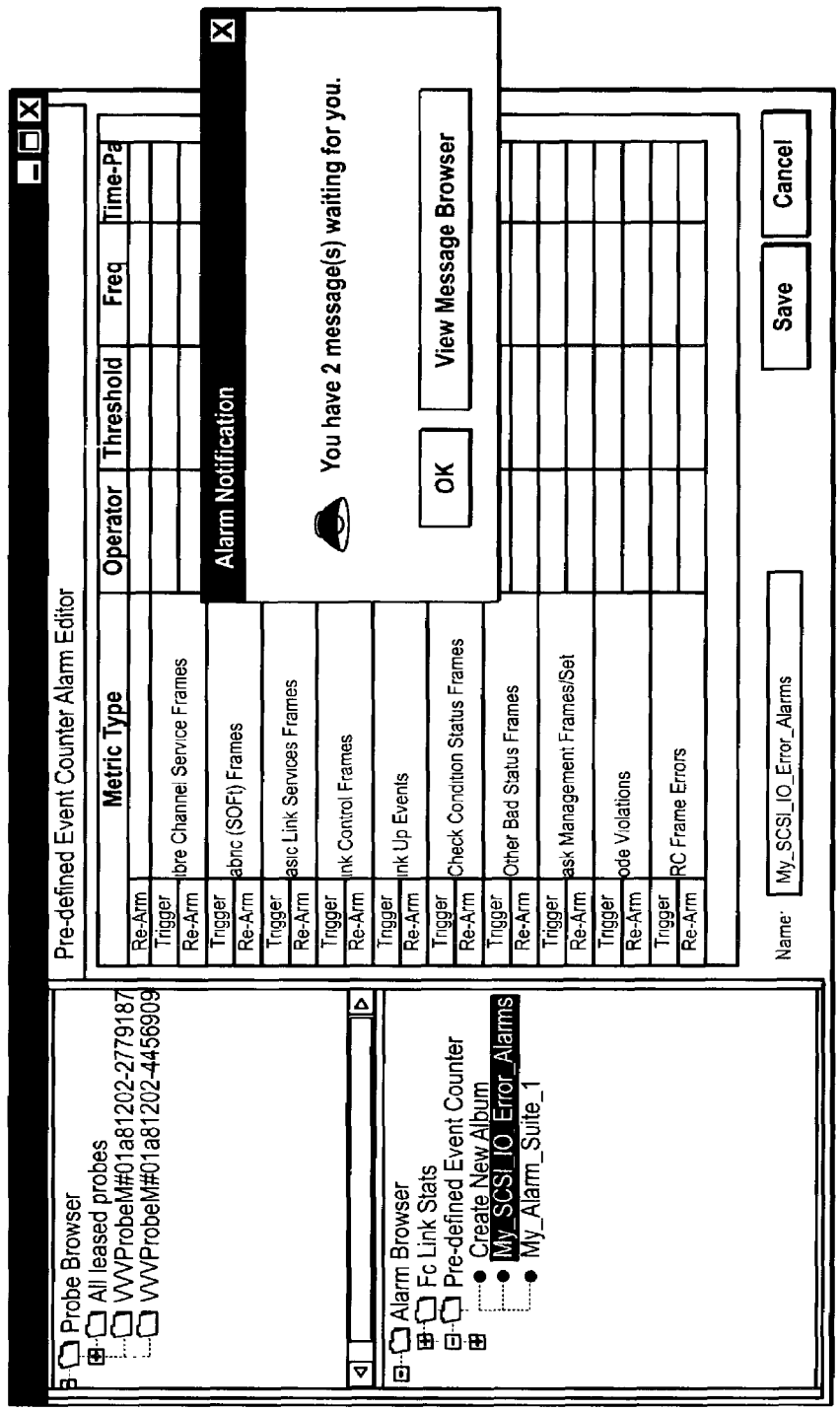
Figure 7:
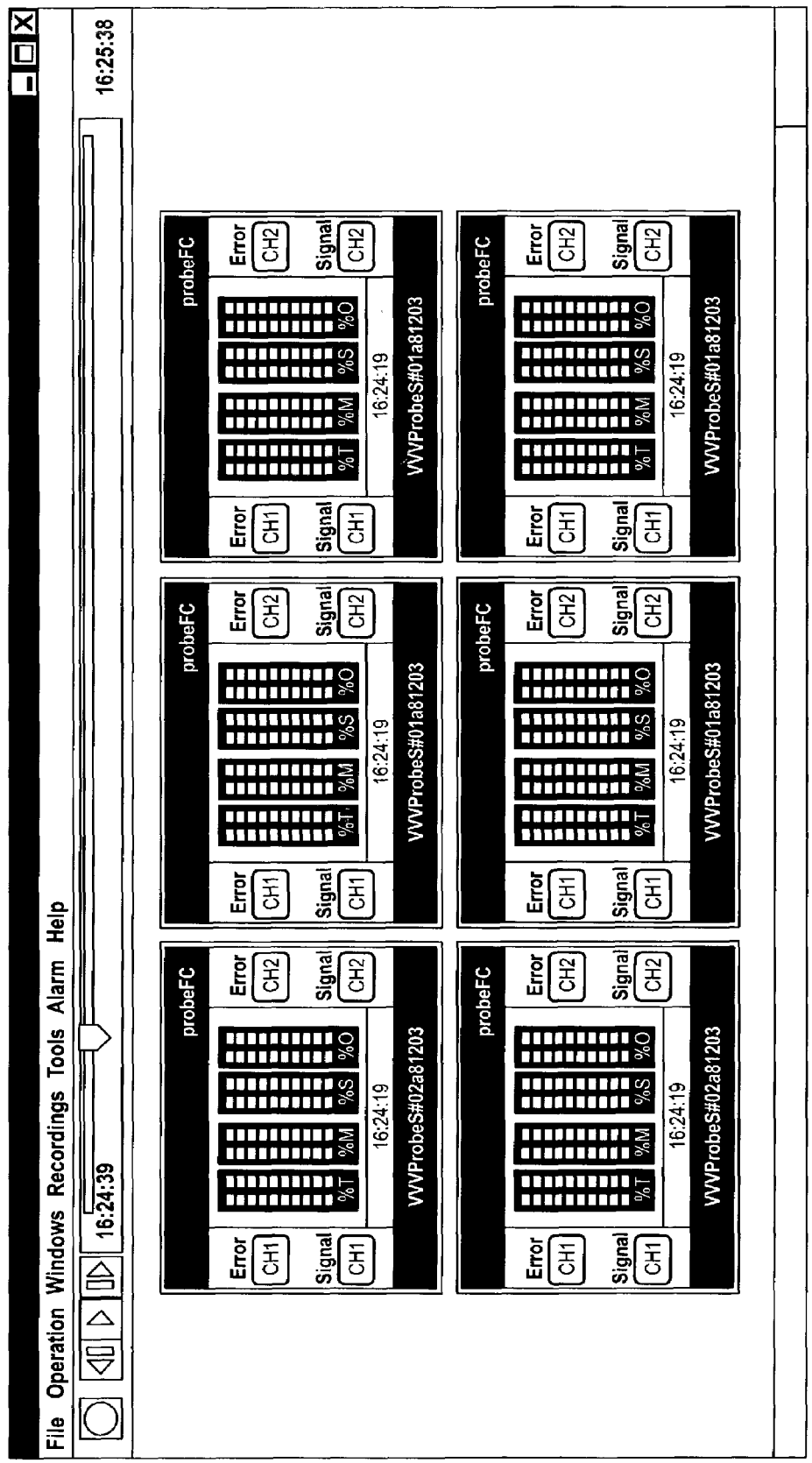
Figure 8:
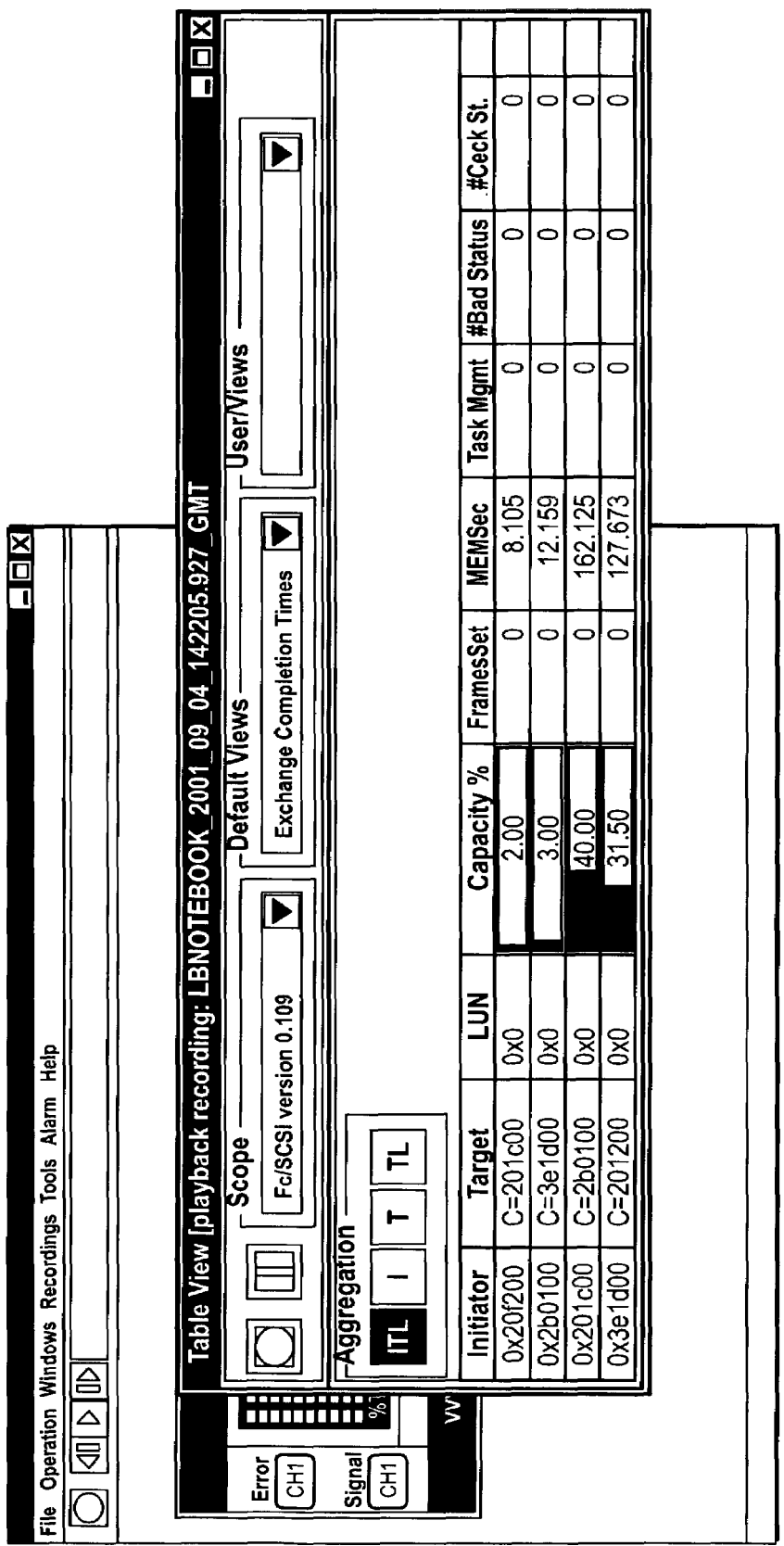
Figure 9:
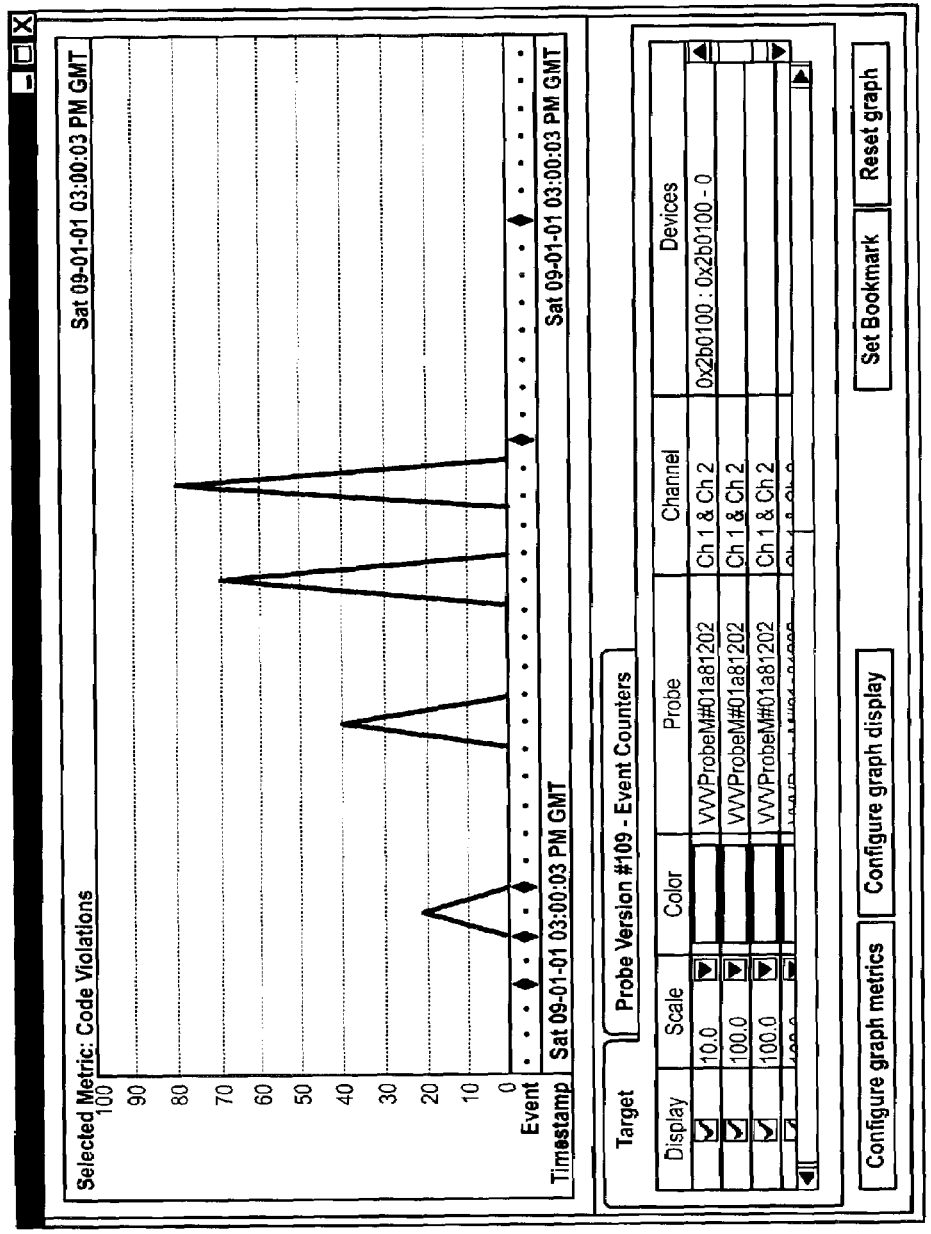

Once secondary data is received, the client tier 50 presents the corresponding information via a suitable interface to human administrators of the network. Preferably, the data is presented in a manner so as to allow the network administrator to easily monitor various transaction specific attributes, as well as instantaneous event attributes, detected within the SAN network at the various monitoring points. By way of example, FIGS. 3-9 illustrate some examples of some of the types of data and network information that can be presented to a user for conveying the results of the transaction monitoring at the client tier. For example, FIGS. 3A, 3B and 4 illustrate graphical interfaces showing end-device conversation monitoring using what is referred to as a Client Graph Window. FIG. 5 illustrates a graphical user interface showing real time transaction latency attributes for a particular storage end-device. FIG. 6 is an illustration of an Alarm Configuration window and an Alarm Notification pop-up window, which can be used to alert a user of the occurrence of a pre-defined network condition, for example. FIG. 7 is an illustration of a "Fabric View" window that provides a consolidated view of traffic levels at multiple links within the network. FIG. 8 is an illustration of "instantaneous" attributes of network traffic, per "end-device" conversation within a single monitored link. FIG. 9 is an illustration of a trend analysis of a single traffic attribute over time. It will be appreciated that any one of a number of attributes can be displayed, depending on the needs of the network manager.

In addition to displaying information gleaned from the secondary data, the client tier 50 can optionally provide additional ancillary functions that assist a network administer in the monitoring of a network. For example, in one embodiment, the client tier 50 can be implemented to monitor specific metric values and to then trigger alarms when certain values occur. Alternatively, the monitoring and triggering of alarms can occur in the Portal tier, and when the alarm condition occurs, the portal tier sends a notification message to the client tier, an example of which is illustrated in FIG. 6. Another option is to log a message to a history log (on the Portal), and the alarm history log can then be queried using the Client interface. Yet another option is for the occurrence of an alarm condition to trigger a recording of all network metrics for a predetermined amount of time. For example, it may be necessary for an network administrator to closely monitor the response time of a data storage device. If the data storage device's response time doubles, for example, an alarm can be configured to alert the network administrator and trigger a metric recording for analysis at a later time. Any one of a number of other alarm "conditions" could be implemented, thereby providing timely notification of network problems and/or conditions to the network administrator via the client tier 50 or email notification.

While they have been described as separate and discreet functional modules, the portal tier 35 and the client tier 50 could alternatively be implemented within one device or software package. For example, a portable testing unit could be created that incorporated the functions of both the portal tier 35 and the client tier 50 into a laptop computer such that a network specialist could then utilize the laptop to analyze various SAN networks. The portable testing unit would also then be operatively connected to a data monitoring probe as previously described.

In contrast, separate portal tiers 35 can be located in different geographical locations, and interconnected with a single client tier 50 by way of a suitable communications channel. This would allow one client tier to monitor multiple SAN networks by simply disconnecting from one portal tier and connecting to another portal tier. This communications interface could even be placed on the Internet to facilitate simplified monitoring connections from anywhere in the world. Similarly, a Web (HTTP) interface can be provided to the Portal.

In yet another embodiment, the client tier 50 could be replaced by an application programming interface (API) such that third-party vendors could produce a suitable user interface to display various transaction specific attributes, as well as instantaneous event attributes, received via the secondary data. Any appropriate interface could be utilized, including a graphics-based or a text-based interface.

To summarize, the client tier 50 provides a user interface that allows a user, such as a network administrator, to easily view information relevant to the operating status of a network. Moreover, due to the unique three-tiered architecture used, the client tier is able to display information in a manner that allows simultaneous monitoring of multiple links in a network such as a SAN.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A system for monitoring network traffic present on a communications network, the system comprising:
   at least one data collection source comprising:
      a network link circuit connected to the communications network to monitor a plurality of data streams having a predetermined length, the network link circuit generating from each data stream a corresponding data interval; and
      a data frame circuit that receives the plurality of data intervals, the data frame circuit being configured to generate at least one metric based upon the contents of at least one data interval, wherein the metric contains data that is representative of at least one characteristic of network traffic;
   a portal computing device comprising:
      an operative connection to that at least one data collection source that allows selective receipt of the metric; and
      means for generating a secondary data structure that contains a plurality of metrics; and
   a client computing device comprising:

an operative connection to the portal computing device that allows selective receipt of the secondary data structure; and means for selectively displaying network information derived from the contents of at least one secondary data structure.

2. A system as defined in claim 1, wherein at least one of the plurality of data streams includes a storage I/O transaction communicated between at least two devices interconnected by the communications network.

3. The system as defined in claim 1, wherein the metric is generated at substantially the same rate as the speed of the communications network.

4. The system as defined in claim 3, wherein the speed of the communications network is approximately one gigabit per second or greater.

5. The system as defined in claim 1, wherein the communications network is a Fibre Channel network running a SCSI upper level protocol.

* * * * *